United States Patent Office 3,426,100
Patented Feb. 4, 1969

3,426,100
CRYSTALLINE BLOCK POLYESTER-
POLYCARBONATES
Leslie Marvin McDonough, Overland Park, Kans., assignor to E. I. du Pont de Nemours and Company, Wilmington, Del., a corporation of Delaware
No Drawing. Filed Nov. 3, 1964, Ser. No. 408,665
U.S. Cl. 260—860                                   14 Claims
Int. Cl. C08g 39/02

ABSTRACT OF THE DISCLOSURE

Substantially crystalline block polyester/polycarbonates are prepared by reacting in an organic solvent medium at a temperature of from 160 to 240° C. (A) a crystallizable linear polyester such as polyethylene terephthalate having an intrinsic viscosity of at least 0.4 with (B) a bisphenol type polycarbonate having a glass transition temperature of at least 120° C.

---

This invention relates to copolyester compositions and more particularly to copolymers of crystallizable linear polyesters and polycarbonates, and to the process for preparing said copolymers.

Highly polymeric synthetic linear polyesters from aromatic dicarboxylic acids and the glycols having from 2 to 10 carbon atoms, such as those disclosed by Whinfield and Dickson, U.S.P. 2,465,319, possess many properties which, in the form of self-supporting films, make them useful as articles of commerce. From a commercial standpoint, one of the most important is polyethylene terephthalate. Polyethylene terephthalate film, more particularly, polyethylene terephthalate film which has been molecularly oriented by stretching and/or rolling in mutually perpendicular directions is a tough, durable, highly crystalline film.

Although oriented polyethylene terephthalate is a widely applicable film, certain property limitations, particularly at high temperatures, render it unsuitable for some end use applications and make it a marginal film in others. Some of these properties are dimensional stability, hydrolytic stability and tear strength. In general, these properties are satisfactory below the glass transition temperature (Tg) of polyethylene terephthalate but unsatisfactory at higher temperatures. The term "glass transition temperature" is defined as the temperature at which a discontinuity occurs in the curve of a first derivative thermo-dynamic quantity with temperature. It is correlated with yield temperature and polymer fluidity and can be observed from a plot of density, specific volume, specific heat, sonic modulus or index of refraction against temperature. The glass transition temperature for polyethylene terephthalate is approximately 70° C.

Attempts to impart desired property improvements while retaining the already desirable properties by copolymerizing polyethylene terephthalate with varying amounts of a second acid component have usually failed to achieve the desired purpose; the end result being a randomized copolyester film having a lowered melting point, low crystallinity and a lower glass transition temperature, and being deficient, as well, in certain other physical properties.

It is an object of this invention, therefore, to provide a copolyester composition which exhibits superior thermal properties. It is a further object of this invention to provide a substantially crystalline copolyester composition retaining the tensile characteristics of oriented polyethylene terephthalate, but with enhanced dimensional and thermal stability. It is a still further object of this invention to provide a process for the preparation of a substantially crystalline copolyester composition which, while retaining the tensile characteristics of oriented polyethylene terephthalate, exhibits enhanced dimensional and thermal stability. The foregoing and related objects will more clearly appear from the following description.

These objects are realized by the present invention which, stated in brief, comprises reacting in an organic solvent medium, and at a temperature within the range of from 160 to 240° C., (A) a crystallizable linear polyester of at least one aromatic dicarboxylic acid and at least one glycol selected from the group consisting of polymethylene glycols containing from 2 to 10 carbon atoms said polyester having an intrinsic viscosity of at least 0.4, with (B) a polycarbonate consisting of recurring units of the formula

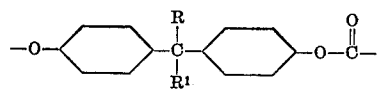

wherein R is selected from the group consisting of a hydrogen atom and a methyl radical, and R¹ is a radical selected from the group consisting of methyl, ethyl, propyl, and butyl, said polycarbonate having a glass transition temperature of at least 120° C., in the presence of catalytic amounts of a catalyst consisting essentially of at least one metal salt selected from the group consisting of zinc, cadmium, manganese, and cobalt salts of a monocarboxylic aliphatic acid having 1 to 7 carbon atoms, the ratio of the polyester A to the polycarbonate B being within the range of 60/40 to 90/10% by weight, whereby to produce a substantially crystalline block copolymer of the type B(AB)ₓAB where $x$ is an integer from 0 to 3, the ratio of A to B in said copolymer being within the range of from 60/40 to 90/10% by weight, the crystalline melting point of said copolymer being substantially the same as the crystalline melting point of said polyester.

The crystallizable linear polyester which will be employed in the process of the present invention is prepared from at least one aromatic dicarboxylic acid and at least one glycol selected from the group consisting of polymethylene glycols containing from 2 to 10 carbon atoms by the method generally disclosed in the aforementioned U.S. Patent 2,465,319. The preferred polyester is polyethylene terephthalate. Other polyesters of importance which may be mentioned are; polyethylene 2,6-naphthalate, and the copolyester formed from ethylene glycol, dimethyl dibenzoate and dimethyl 4,4'-isopropylidene dibenzoate. The polyester must have an intrinsic viscosity of at least 0.4. Lower molecular weight polymer or the monomeric ester will not, when reacted in solution with the polycarbonate, impart in the reaction product the segmented chain length necessary for the desired property characteristics. Intrinsic viscosity is a measure of the degree of polymerization and may be defined as:

Limit $\ln(\eta_r)/C$ as C approaches 0, wherein $\eta_r$ is the viscosity with dilute phenol-tetrachloroethane (60/40) solution of the polyester divided by the viscosity of the phenol-tetrachloroethane mixture per se measured in the same units at the same temperature, and C is the concentration in grams of polyester per 100 cc. of solution.

The polycarbonates copolymerized with the polyester are characterized by recurring units of the formula

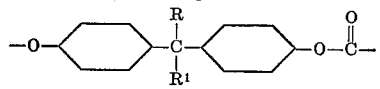

They are prepared by methods known to the art, for example, by the interreaction of alkylidene 4,4'-diphenols and phosgene in the manner described by Schnell, Angewandte Chemie, 68, 633–660, No. 20, Oct. 21, 1956. To realize the advantages of polycarbonates and to insure retention of the desirable properties of the polyester in the copolymer, the polycarbonate should be of sufficient chain length to exhibit a glass transition temperature of at least 120° C. The preferred polycarbonate is poly(2,2-bis[4-hydroxyphenyl]propane carbonate).

It is critical to the invention that the ratio (percent by weight) of the polycarbonate to the polyester be no greater than 40% and no less than 10%. Less than 10% polycarbonate does not produce the desired degree of property enhancement; a proportion of polycarbonate-polyester greater than 40% leads to a reduction in the degree of crystallinity with an accompanying lowering of tensile properties.

The copolymerization reaction is carried out in the presence of an ester interchange catalyst. Such catalysts are known to the art, particularly in polyester synthesis and generally consists essentially of a metal salt selected from the group consisting of zinc, cadmium, cobalt, and manganese salts of monocarboxylic aliphatic acids having 1–7 carbon atoms. The preferred catalytic agent is zinc acetate dihydrate. The quantity of catalyst added to the polymerization reaction may range between .05 to .2% (based on the total weight of reactants) with .1% being preferred.

The reaction between polyester and polycarbonate is preferably carried out in a liquid organic solvent which is a solvent for both polymeric reactants and which has a boiling point within the range of 160–240° C. The preferred solvent is nitrobenzene. The temperature and pressure at which the copolymerization reaction is carried out are not critical. Satisfactory results are obtained within the temperature range of 160–240° C., and at atmospheric pressure.

In the preferred embodiment of my invention, 70–80% by weight particulate polyethylene terephthalate is mixed with 20–30% by weight particulate poly(2,2-bis[4-hydroxyphenyl]propane carbonate) and .012% zinc acetate dihydrate, dissolved in nitrobenzene, refluxed for 3 to 3.5 hours, cooled, solvent washed, and dried. The resulting copolymer may then be melt extruded, stretch oriented and heat-set by techniques well known to the art.

It has been found that by following the process of the present invention there results a block copolymer of the type $B(AB)_xAB$ where B is a polycarbonate segment and A is a polyester segment and x is an integer from 0 to 3. The length of the A segment must be such that its melting point is within experimental error ($\pm 3°$ C.) of the limiting melting point of the polyester. This being realized, then the melting point of the copolymer will be the same as that of the pure polyester.

The principles and practice of the present invention will now be further described by the examples to follow:

Example 1

Ninety grams of polyethylene terephthalate having an intrinsic viscosity of 0.54, and a glass transition temperature of 68° C., prepared from an ester interchange reaction between dimethyl terephthalate and ethylene glycol and a subsequent polycondensation step carried out in the presence of ester interchange and polymerization catalysts in a manner such as that described in U.S. Patent 2,465,319 to Whinfield and Dickson, 10 grams of poly(2,2-bis[4-hydroxyphenyl]propane carbonate) having a glass transition temperature of 146° C., and 0.01 gram zinc acetate dihydrate were dissolved in 300 ml. of nitrobenzene and the solution was refluxed for 3.5 hours. After cooling, the copolymer was removed by suction filtration and washed with acetone until the acetone wash was colorless. The remaining nitrobenzene was removed by heat at 100° C. under less than 1 mm. of Hg. The resulting copolymer was then melt pressed into the form of thin film. This film was molecularly oriented by stretching in both longitudinal and transverse directions to an extent of 3× its initial dimension in a manner and on apparatus similar to that described in U.S. Patent 2,823,421 to Scarlett. After orientation, the 1 mil thick film was heat-set while held under tension at a temperature of 200° C. for 10 minutes.

Example 2

The procedure outlined in Example 1 was repeated with the exception that 80 grams of polyethylene terephthalate and 20 grams of poly(2,2-bis[4-hydroxyphenyl]propane carbonate) were employed instead of the 90/10 ratio used in Example 1. A molecularly oriented heat-set film 1 mil thick was obtained.

Example 3

The procedure outlined in Example 1 was repeated with the exception that 70 grams of polyethylene terephthalate and 30 grams of poly(2,2-bis[4-hydroxyphenyl]propane carbonate) were employed instead of the 90/10 ratio used in Example 1. A molecularly oriented heat-set film 1 mil thick was obtained.

Example 4

The procedure outlined in Example 1 was repeated with the exception that 60 grams of polyethylene terephthalate and 40 grams of poly(2,2-bis[4-hydroxyphenyl]propane carbonate) were employed instead of the 90/10 ratio used in Example 1. A molecularly oriented heat-set film 1 mil thick was obtained.

Example 5

The procedure described in Example 1 was again repeated with the exception that no catalyst (zinc acetate dihydrate) was employed. The resultant molecularly oriented heat-set film was 1 mil thick.

Physical property and thermal stability tests were conducted on samples of each film prepared in the above examples and compared with the physical and thermal properties of commercially manufactured polyethylene terephthalate film. Table I below lists the crystalline melting point, glass transition temperature (Tg), tensile strength (p.s.i.×$10^{-5}$), elongation percent, modulus (p.s.i.×$10^{-5}$), $F_5$ (force at 5% elongated expressed as p.s.i.×$10^{-5}$), percent shrinkage of 105 and 150° C., hydrolytic stability, as measured by the time for the film to embrittle in an atmosphere of steam at 130° C., and tear strength (grams per mil).

TABLE I

| Ex. No. | Polymeric Composition | Crystalline Melting Point, °C. | (Tg) °C.[1] | Tensile Strength (p.s.i.×$10^{-5}$) | Elong., percent | Modulus (p.s.i.×$10^{-5}$) | $F_5$ (p.s.i.×$10^{-5}$) | Tear Strength (g./mil.) | Thermal Properties percent Shrinkage at— 105° C. | 150° C. | Appear. | Hydrolytic Stability (Hours to Embrittle in Steam at 130° C.) |
|---|---|---|---|---|---|---|---|---|---|---|---|---|
| 1 | PET[2]/PC[3] (90/10) | 259±3 | 77 | 23 | 90 | 500 | 12 | 18 | | | Clear | 25 |
| 2 | PET[2]/PC[3] (80/20) | 259±3 | 86 | 23 | 60 | 500 | 12 | | | | do | 48 |
| 3 | PET[2]/PC[3] (70/30) | 259±3 | 94 | 18 | 35 | 480 | 12 | 26 | 0.2 | 0.9 | do | 86 |
| 4 | PET[2]/PC[3] (60/40) | 259±3 | 103 | 16 | 30 | 400 | 10 | 28 | | | do | 90 |
| 5 | PET[2]/PC[3] (70/30)[4] | 259±3 | | 8 | 20 | 200 | | 8 | | | Opaque | 6 |
| Cont | PET[2] | 259±3 | 68 | 23 | 90 | 500 | 12 | 18 | 0.6 | 2.6 | Clear | 21 |

[1] (Tg) Glass transition temperature.  [2] PET, Polyethylene terephthalate.  [3] PC, Poly(2,2-bis[4-hydroxyphenyl]propane carbonate.  [4] No catalyst employed; this is a mixture rather than a copolymer.

As can be seen from the foregoing table, the copolymeric compositions prepared in accordance with the practices of the present invention (Examples 1–4) while possessing substantially identical crystalline melting point and physical properties (tensile, modulus and $F_5$), exhibits a striking improvement in dimensional stability as measured at 105 and 150° C., and in hydrolytic stability. That a new, unique, and useful copolymer has been produced may be evidenced from a study of the glass transition temperature of the films of Examples 1 and 2 compared with that of pure polyethylene terephthalate and bis-phenol A polycarbonate. The copolymeric compositions prepared in Examples 1 to 4 show new glass transition temperature characteristics of the copolymer at 77, 86, 94 and 103° C. respectively as compared with 68° C. for pure polyethylene terephthalate and 146° C. for pure polycarbonate. This evidence indicates that the polymer structure comprises a polyethylene terephthalate chain of near normal degree of polymerization terminated at both ends by a shorter polycarbonate chain i.e., a block copolymeric configuration.

The necessity for the catalyst employed in the copolymerization process of the present invention is illustrated by Example 5, wherein no catalyst was employed in the solution polymerization. The resulting film prepared from this reaction product not only possessed substantially poor physical thermal properties as evidenced from Table I, but also had a glass transition temperature substantially identical with that of polyethylene terephthalate; indicating that the polymer chains are not connected in the desired block configuration.

Example 6

Monomeric bishydroxyethyl naphthalene 2,6-dicarboxylate was prepared by carrying out an ester-interchange reaction in a conventional manner between ethylene glycol and dimethyl naphthalene 2,6-dicarboxylate utilizing an ester interchange catalyst comprising manganous acetate ($Mn(OAc)_2 \cdot 4H_2O$) and antimony trioxide ($Sb_2O_3$).

Polymer was prepared from the the monomeric material by carrying out a polymerization reaction in the presence of antimony trioxide ($Sb_2O_3$) at a temperature of 285–290° C. under reduced pressure within the range from 0.05–2.5 mm. of mercury. The polymerization reaction was carried out until the intrinsic viscosity exceeded 0.55.

In a manner similar to that described in Example 1, 70 grams of the polyethylene naphthalene 2,6-dicarboxylate, 30 grams of poly(2,2-bis[4-hydroxyphenyl]propane carbonate) having a glass transition temperature of 146° C., and 0.01 gram zinc acetate dihydrate were dissolved in 300 ml. nitrobenzene, the solution refluxed for 3.5 hours, cooled, washed with acetone, and the residual solvent removed. The resulting copolymer was then melt pressed into the form of a thin film. This film was molecularly oriented by stretching in both the longitudinal and transverse directions to an extent of 3 times its initial dimension. After orientation, the 1 mil thick film was heat-set while held under tension at a temperature of 220° C. The resulting film was found to be tough, crystalline and to exhibit a crystalline melting point of 265±3° C. substantially that of pure polyethylene naphthalene 2,6-dicarboxylate.

Example 7

An ester-interchange reaction was carried out in a conventional manner between ethylene glycol and a mixture of dimethyl dibenzoate and dimethyl 4,4'-isopropylidene dibenzoate in the presence of manganous acetate and antimony trioxide.

After the ester-interchange reaction was complete, the monomer was polymerized by conventional methods to an intrinsic viscosity of greater than 0.5.

In a manner similar to that described in Example 1, 70 grams of the newly formed polymer were reacted with 30 grams of poly(2,2-bis[4-hydroxyphenyl]propane carbonate) having a glass transition temperature of 146° C., and was pressed into film form, molecularly oriented and heatset. The film was found to be tough and crystalline. It had a melting point of 285–295° C. substantially that of the pure dibenzoate copolymer.

Examples 8–11

In these examples polyethylene terephthalate was copolymerized with various polycarbonates in a manner previously described in Example 1. The ratio of the polyethylene terephthalate to the polycarbonate was 70/30% by weight. The polycarbonate employed was prepared from the interreaction of the corresponding alkylidene bis-phenol and phosgene in the manner described by Schnell, Angewandte Chemie, 68, 633–660, No. 20, Oct. 21, 1956. Table II lists the various polycarbonates employed and their glass transition temperatures.

TABLE II.—POLYCARBONATES COPOLYMERIZED WITH POLYETHYLENE TEREPHTHALATE

| Ex. No. | Polycarbonate | Glass Transition Temp. (Tg)° C. |
|---|---|---|
| 8 | 4,4'-dihydroxy-diphenyl-1,1-ethane | 130 |
| 9 | 4,4'-dihydroxy-diphenyl-1,1-isobutane | 149 |
| 10 | 4,4'-dihydroxy-diphenyl-2,2-propane | 149 |
| 11 | 4,4'-dihydroxy-diphenyl-1,1-cyclohexane | 171 |

In each case, when a thin film was formed from the above copolymeric compositions, a tough crystalline film having essentially the same melting point of pure polyethylene terephthalate (259±3° C.) resulted showing that a block copolymer had been prepared.

The segmented block copolymers characterizing the present invention satisfies the long existing need of industry for polymeric film possessing not only superior physical (tensile) properties, but also superior hydrolytic stability and dimensional stability. Films prepared from these polyester-polycarbonate compositions possess essentially none of the weaknesses of pure polyethylene terephthalate film (relatively low dimensional stability and hydrolytic stability at temperatures above the glass transition temperature) and polycarbonate film (lack of crystallinity and inadequate tensile properties). These tough crystalline structures may be ideally employed in many end use applications, particularly in applications where the structure will be subjected to high temperatures and humidity, such as insulation for electrical motors and magnetic tapes.

What is claimed is:

1. A process for producing a block polymer which comprises reacting in an organic solvent medium and at a temperature within the range of from 160 to 240° C., (A) a crystallizable linear polyester of at least one aromatic dicarboxylic acid and at least one glycol selected from the group consisting of polymethylene glycols containing 2 to 10 carbon atoms, said polyester having an intrinsic viscosity of at least 0.4 in a solvent mixture of phenol and tetrachloroethane in the ratio of 60:40, with (B) a polycarbonate consisting of recurring units of the formula

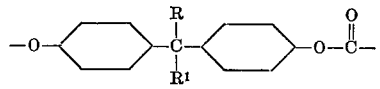

where R is selected from the group consisting of a hydrogen atom and a methyl radical, and $R^1$ is a radical selected from the group consisting of methyl, ethyl, propyl, and butyl, said polycarbonate having a glass transition temperature of at least 120° C., in the presence of an ester interchange catalyst, the ratio of polyester A to polycarbonate B being within the range of 60/40 to 90/10% by weight.

2. The process of claim 1 wherein the ratio of the polyester to the polycarbonate is within the range of 70/30 to 80/20% by weight.

3. The process of claim 1 wherein the catalyst is zinc acetate.

4. The process of claim 1 wherein the polyester is polyethylene terephthalate.

5. The process of claim 1 wherein the polycarbonate is poly(2,2-bis[4-hydroxyphenyl]propane carbonate).

6. The process of claim 1 wherein the solvent medium is nitrobenzene.

7. A process for producing a block polymer which comprises heating under reflux conditions for about 3.5 hours a solution consisting of (A) polyethylene terephthalate having an intrinsic viscosity of at least 0.4 in a solvent mixture of phenol and tetrachloroethane in the ratio of 60:40, (B) poly(2,2-bis[4-hydroxyphenyl]propane carbonate) having a glass transition temperature of approximately 146° C., and (C) a catalytic amount of zinc acetate, in (D) nitrobenzene as solvent, the ratio of polyethylene terephthalate to poly(2,2-bis[4-hydroxyphenyl]propane carbonate) being within the range of 60/40 to 90/10% by weight.

8. A crystalline block polymer of the type $B(AB)_xAB$ wherein A is a crystallizable linear polyester of at least one aromatic dicarboxylic acid and at least one glycol selected from the group consisting of polymethylene glycols containing 2 to 10 carbon atoms, said polyester having an intrinsic viscosity of at least 0.4 in a solvent mixture of phenol and tetrachloroethane in the ratio of 60:40, and B is a polycarbonate consisting of recurring units of the formula

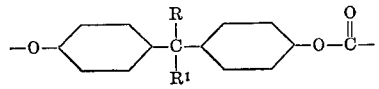

where R is selected from the group consisting of a hydrogen atom and a methyl radical, and $R^1$ is a radical selected from the group consisting of methyl, ethyl, propyl, and butyl, said polycarbonate having a glass transition temperature of at least 120° C., and $x$ is an integer of from 0 to 3, the ratio of A to B being within the range of from 60/40 to 90/10% by weight, said block polymer having a melting point substantially the same as that of said polyester A.

9. The polymer of claim 8 in the form of film.

10. The polymer of claim 8 wherein the ratio of A to B is within the range of from 70/30 to 80/20% by weight.

11. The polymer of claim 8 wherein the polycarbonate is poly(2,2-bis[4-hydroxyphenyl]propane carbonate).

12. The polymer of claim 8 wherein the polyester is polyethylene terephthalate.

13. The polymer of claim 12 wherein the polycarbonate is poly(2,2-bis[4-hydroxyphenyl]propane carbonate).

14. The polymer of claim 13 in the form of film.

References Cited

UNITED STATES PATENTS

| | | | |
|---|---|---|---|
| 3,000,849 | 9/1961 | Clachan et al. | 260—860 |
| 3,218,372 | 11/1965 | Okamura et al. | 260—860 |
| 2,623,031 | 12/1952 | Snyder | 260—860 |
| 3,119,787 | 1/1964 | Laakso et al. | 260—860 |
| 3,207,814 | 9/1965 | Goldberg | 260—860 |
| 3,278,640 | 10/1966 | Goldberg et al. | 260—860 |

OTHER REFERENCES

Bjarksten, Polyesters and Their Application, Reinhold Publishing Corp., New York, 1956 (pages 201–205 relied on).

MURRAY TILLMAN, *Primary Examiner.*

J. T. GOOLKASIAN, *Assistant Examiner.*

U.S. Cl. X.R.

260—32.4